(12) United States Patent
Aytur et al.

(10) Patent No.: US 8,457,162 B2
(45) Date of Patent: Jun. 4, 2013

(54) PACKET DETECTION

(75) Inventors: Turgut Aytur, Plattsburgh, NY (US);
Stephan ten Brink, Irvine, CA (US);
Ravishankar H. Mahadevappa, Irvine, CA (US); Ran Yan, Holmdel, NJ (US)

(73) Assignee: Realtek Semiconductor Corp., Hsinchu (TW)

( * ) Notice: Subject to any disclaimer, the term of this patent is extended or adjusted under 35 U.S.C. 154(b) by 1614 days.

(21) Appl. No.: 11/506,193

(22) Filed: Aug. 16, 2006

(65) Prior Publication Data

US 2007/0055501 A1   Mar. 8, 2007

Related U.S. Application Data

(60) Provisional application No. 60/708,971, filed on Aug. 16, 2005.

(51) Int. Cl.
*H04J 3/06* (2006.01)
(52) U.S. Cl.
USPC .......................................................... 370/503
(58) Field of Classification Search
USPC .......................................................... 370/503
See application file for complete search history.

(56) References Cited

U.S. PATENT DOCUMENTS

| | | | |
|---|---|---|---|
| 6,359,939 B1 | 3/2002 | Calderone | |
| 6,868,091 B1 | 3/2005 | Hui et al. | |
| 7,031,265 B2 | 4/2006 | Owen et al. | |
| 7,203,254 B2 | 4/2007 | Carsello et al. | |
| 7,577,218 B2 * | 8/2009 | Kim et al. | 375/343 |
| 2003/0031275 A1 | 2/2003 | Min et al. | |
| 2004/0032825 A1 * | 2/2004 | Halford et al. | 370/208 |
| 2004/0190663 A1 * | 9/2004 | Carsello et al. | 375/354 |
| 2005/0254559 A1 * | 11/2005 | Hou et al. | 375/150 |
| 2006/0007986 A1 | 1/2006 | Larsson | |
| 2006/0008035 A1 * | 1/2006 | Larsson | 375/343 |
| 2006/0077300 A1 | 4/2006 | Cheon et al. | |
| 2007/0211785 A1 * | 9/2007 | Nakache et al. | 375/136 |

OTHER PUBLICATIONS

International Search Report for International Patent Application No. PCT/US2006/032070, filed Aug. 16, 2006, International Search Report dated Mar. 15, 2008 and mailed Mar. 20, 2008 (4 pgs.).
Written Opinion of the International Search Report for International Patent Application No. PCT/US2006/032070, filed Aug. 16, 2006, Written Opinion of the International Search Report dated Mar. 15, 2008 and mailed Mar. 20, 2008 (3 pgs.).

* cited by examiner

*Primary Examiner* — Mark Rinehart
*Assistant Examiner* — Angel Brockman
(74) *Attorney, Agent, or Firm* — McClure, Qualey & Rodack, LLP

(57) ABSTRACT

An apparatus for and a method of performing packet detection in a receiver is provided. The apparatus is configured to determine a measure of a correlation between information of one or more received symbols and synchronization information. The apparatus is also configured to determine a measure of an energy value of one or more of the received symbols. The apparatus is also configured to determine if a packet has been detected based on the measure of the correlation and the measure of the energy value of the one or more received symbols.

15 Claims, 12 Drawing Sheets

| TFC number | subband nb time $k=0$ | $k=1$ | $k=2$ | $k=3$ | $k=4$ | $k=5$ |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 1 | 2 | 2 |
| 5 | 1 | 1 | 1 | 1 | 1 | 1 |
| 6 | 2 | 2 | 2 | 2 | 2 | 2 |
| 7 | 3 | 3 | 3 | 3 | 3 | 3 |

FIG. 12

PACKET DETECTION

CROSS-REFERENCE TO RELATED APPLICATION

This application claims the benefit of the filing date of U.S. Provisional Patent Application No. 60/708,971, filed Aug. 16, 2005, the disclosure of which is incorporated by reference herein.

BACKGROUND

The present invention relates generally to ultrawideband (UWB) communication systems, and more particularly to packet detection in UWB communication systems.

Wireless communication systems generally communicate by transmitting and receiving information centered about a single predetermined carrier frequency. Use of only a single carrier frequency may result in deleterious effects on the information due to factors such as signal interference.

UWB communication systems generally communicate using signals over a wide band of frequencies thereby allowing for increased effective bandwidth between devices and minimizing the effects of interference about any particular frequency. In UWB orthogonal frequency division multiplexing (UWB-OFDM) communication systems, information is received over a number of communication channels centered about different frequencies, with each channel including information of transmitted packets. OFDM symbols within a transmitted packet are received over a number of sub-bands that are each at a slightly different frequency. Unfortunately, these and other types of UWB communication systems may require significant processing to perform packet detection.

BRIEF SUMMARY OF THE INVENTION

A method of performing packet detection in a receiver is provided. In one aspect the method includes: determining a measure of a correlation between information of the received symbol and synchronization information; determining a measure of an energy value of one or more of received symbols; and determining if a packet has been detected based on the measure of the correlation and the measure of the energy value.

Within the method, in some aspects determining the measure of the correlation includes: determining a plurality of measures of sample correlations by correlating samples of the one or more received symbols with a first synchronization sequence of the synchronization information; and determining a measure of a group correlation by correlating the plurality of measures of the sample correlations with a second synchronization sequence of the synchronization information. In some aspects the synchronization information includes: a first synchronization sequence; and a second synchronization sequence, each of the first synchronization sequence and the second synchronization sequence indicative of the pattern by which the one or more received symbols are transmitted. Further, the measure of the energy value is a value within an energy sub-region among a plurality of energy sub-regions.

Within the method, in some aspects determining if the packet has been detected is performed by evaluating a relationship between the correlation and the measure of the energy value wherein for a determination that the packet has been detected, a higher measure of the correlation requires a higher measure of the energy value.

Alternately, in some aspects determining if the packet has been detected is performed by evaluating a relationship between the measure of the correlation and the measure of the energy value wherein for a determination that the packet has been detected, a ratio between the measure of the correlation and the measure of the energy value is required to be greater than a selected energy threshold. In some aspects the selected energy threshold is selected from among a plurality of predetermined energy thresholds, the selected energy threshold being indicative of the measure of the energy value.

Alternately, in some aspects determining if the packet has been detected is performed by evaluating a relationship between the measure of the correlation and the measure of the energy value wherein for a determination that the packet has been detected, an increase in the measure of the correlation requires an increase in the measure of the energy value that is greater than the increase in the measure of the correlation.

Alternately, in some aspects determining if the packet has been detected is performed by evaluating a relationship between the measure of the correlation and the measure of the energy value wherein for a determination that the packet has not been received, the measure of the energy value is below a predetermined minimum energy threshold.

A packet detection unit in a receiver is also provided. In one aspect the packet detection unit includes: a correlation block configured to receive one or more symbols and determine a measure of a correlation between information of the one or more symbols and synchronization information; an energy value block configured to receive the one or more symbols and determine a measure of the energy value of the one or more symbols; and determine a packet detection block coupled to the correlation block and to the energy value block, the packet detection block configured to receive the measure of the correlation and the measure of the energy value and determine if a packet has been detected based on the measure of the correlation and the measure of the energy value.

In some aspects the correlation block includes: a sample correlation block configured to determine a plurality of measures of sample correlations between samples of the one or more symbols and a first sequence of the synchronization information; and a group correlation block configured to determine a measure of a group correlations by correlating the measures of the sample correlations and a second sequence of the synchronization information. In some aspects the measure of the energy value is a value within an energy sub-region among a plurality of energy sub-regions.

In some aspects the packet detection block determines if the packet has been detected by evaluating a relationship between the measure of the correlation and the measure of the energy value wherein for a determination that the packet has been detected, a higher measure of the correlation requires a higher measure of the energy value.

Alternately, in some aspects the packet detection block determines if the packet has been detected by evaluating a relationship between the measure of the correlation and the measure of the energy value wherein for a determination that the packet has been detected, a ratio between the measure of the correlation and the measure of the energy value is required to be greater than a predetermined threshold. In some aspects the predetermined threshold is a selected threshold among a plurality of thresholds, wherein the selected threshold is indicative of the measure of the energy value.

Alternately, in some aspects the packet detection block determines if the packet has been detected by evaluating a relationship between the measure of the correlation and the measure of the energy value wherein for a determination that the packet has been detected, an increase in the measure of the correlation requires an increase in the measure of the energy value that is greater than the increase in the measure of the correlation.

Alternately, in some aspects the packet detection block determines if the packet has been detected by evaluating a relationship between the measure of the correlation and the measure of the energy value wherein for a determination that the packet has not been received, the measure of the energy value is below a predetermined minimum energy threshold.

A receiver for receiving symbols transmitted in a UWB communication system is also provided. In some aspects the receiver includes: a receiver antenna for receiving signals including the symbols; a radio frequency processing unit coupled to the receiver antenna for converting the signals from analog to digital format; a signal processing unit coupled to the radio frequency processing unit the signal processing unit for determining a first plurality of samples of the symbols to be discarded and to maintain a second plurality of samples to be passed through, wherein the signal processing unit includes a packet detection unit configured for determining if a packet has been detected based on a measure of the correlation and a measure of an energy value of the signals; and a Fast Fourier Transform unit coupled to the signal processing unit for receiving and transforming the second plurality of samples from time domain to frequency domain.

In some aspects the packet detection unit is configured for determining if the packet has been detected is performed by evaluating a relationship between the measure of the correlation and the measure of the energy value wherein for a determination that the packet has been detected, a higher measure of the correlation requires a higher measure of the energy value.

A system for performing packet detection at a receiver is also provided. In some aspects the system includes: a packet detection unit, wherein a correlation block receives a symbol and determines a measure of a correlation between samples of the symbol and synchronization information; wherein an energy value block receives the symbol and determines a measure of an energy value of the received symbol; and wherein a packet detection block coupled to the correlation block and to the measure of the energy value block, receives the measure of the correlation and the measure of the energy value and determines if a packet has been detected based on the measure of the correlation and the measure of the energy value, wherein for a determination that the packet has been detected, a higher measure of the correlation requires a higher measure of the energy value.

These and other aspects of the invention are more fully comprehended upon consideration of this document, including the claims and accompanying figures which are part thereof.

BRIEF DESCRIPTION OF THE DRAWINGS

FIG. 12 is an illustration of a table of time-frequency codes for OFDM symbols of a packet transmitted in a UWB communication system in accordance with aspects of the invention.

DETAILED DESCRIPTION

Figure 1:
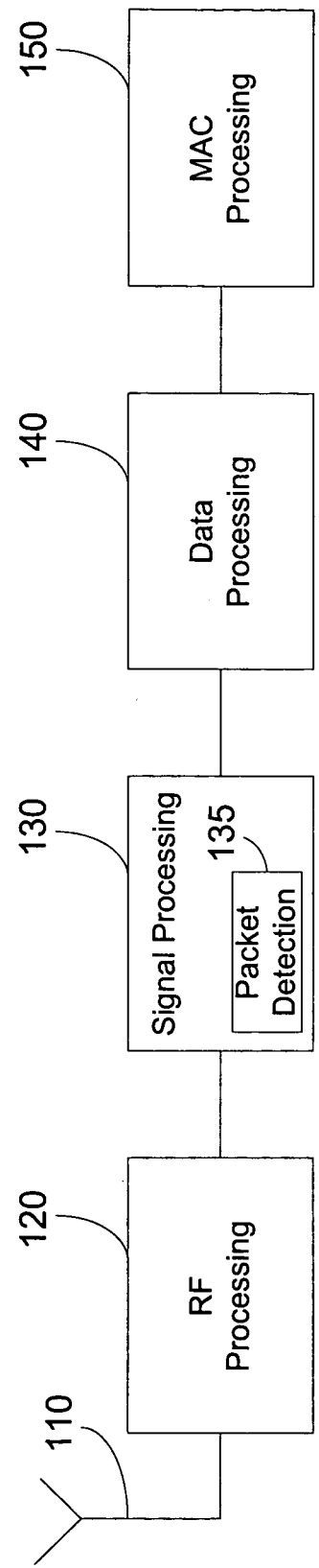
FIG. 1 illustrates an embodiment of a reception system for receiving signals, including symbols, transmitted in a UWB communication system in accordance with aspects of the invention.

FIG. 1 illustrates a reception system for receiving signals transmitted in a UWB communication system in accordance with aspects of the invention. The reception system of FIG. 1 includes a receiver antenna 110, a radio frequency (RF) processing block 120, a signal processing block 130, a data processing block 140 and a medium access controller (MAC) processing block 150. RF processing block 120 is configured to receive an analog signal received at receiver antenna 110, amplify the signal, downconvert the signal from RF to baseband and convert the signal from analog to digital form. Signal processing block 130 is configured to receive an output signal indicative of the RF processing block 120 output and perform functions typically performed in a signal processing block of a reception system. These functions often include packet detection, frame synchronization, automatic gain control and symbol null prefix removal and other functions. In some embodiments, signal processing block 130 is also configured to receive one or more signals indicative of parameters according to which packet detection will be performed, provided for example by a MAC.

Included in signal processing block 130 is a packet detection sub-block 135. The packet detection sub-block 135 includes circuitry for performing packet detection. In most embodiments, the circuitry is configured to detect receipt of a signal having a predefined characteristic. Often a packet will include a preamble portion and a data portion, with the preamble portion including the predefined characteristic, usually in the form of predefined information, with the packet detection circuitry configured to detect receipt of the predefined information.

In one embodiment, signal processing block 130 is configured to receive a signal indicative of a number of symbols to analyze before performing packet detection. In another embodiment, signal processing block 130 is configured to receive a signal indicative of synchronization information by which packet detection will be performed. In another embodiment, signal processing block 130 is configured to receive signals indicative of one or more predetermined energy thresholds for use in packet detection.

Data processing block 140 is configured to receive an output from signal processing block 130 and perform Fast Fourier Transform (FFT) processing, demapping, deinterleaving and decoding. In some embodiments, the FFT is a 128-point FFT, and the demapping is quadrature phase shift keying (QPSK) or dual carrier modulation (DCM) demapping. Additionally, in some embodiments, data processing block 140 is also configured to perform channel estimation and phase estimation. MAC processing block 150 is configured to receive the output of data processing block 140. In some embodiments, MAC processing block 150 is also configured to provide signal processing block 130 with information such as a frequency band for use in reception, a time-frequency code indicate a time frequency hopping pattern, or other information.

Figure 2:
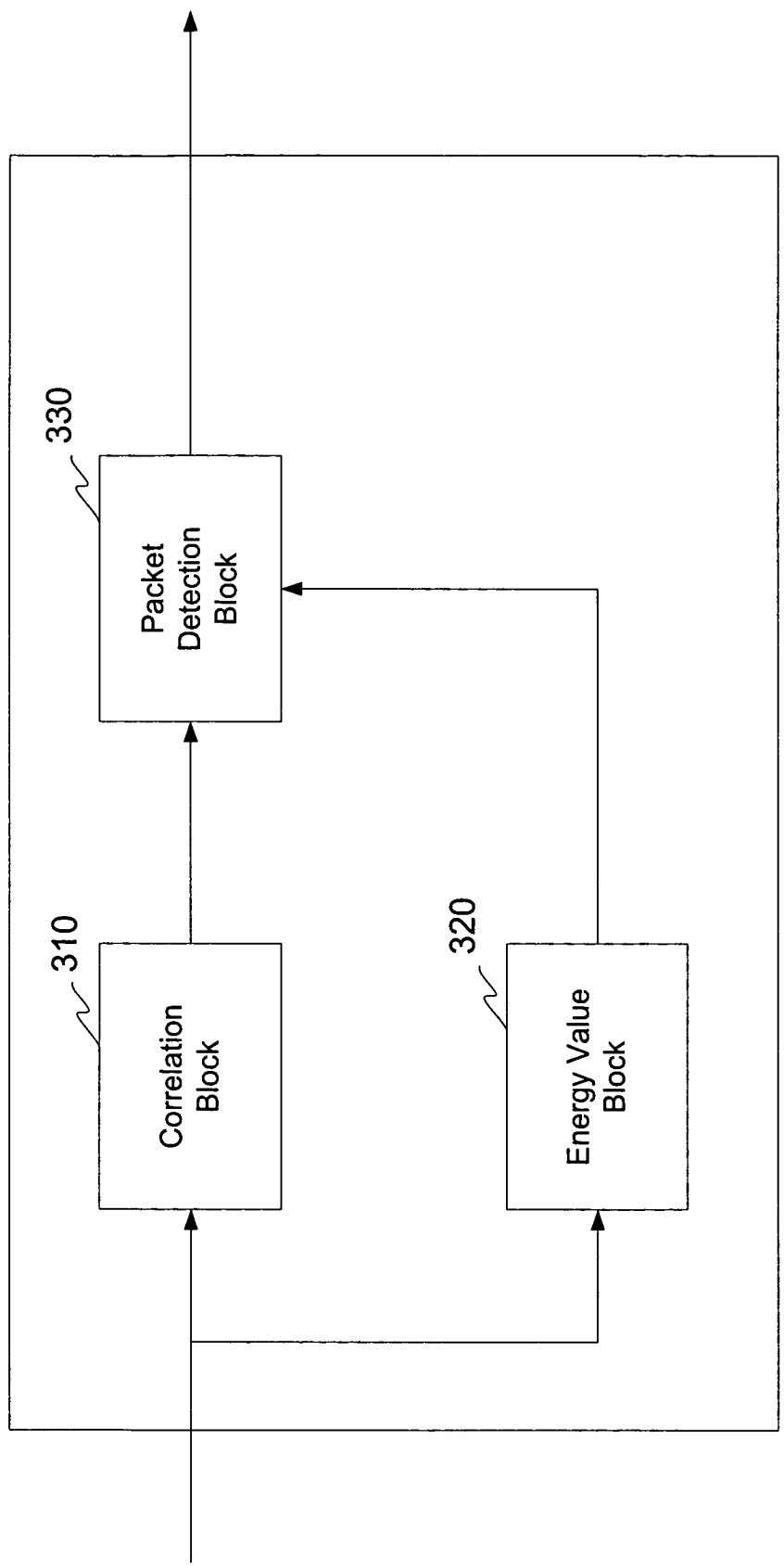
FIG. 2 illustrates an embodiment of a block diagram of a packet detection unit in accordance with aspects of the invention.

FIG. 2 illustrates a block diagram of a packet detection unit in accordance with aspects of the invention. The packet detection unit of FIG. 2 includes a correlation block 310, an energy value block 320 and a packet detection block 330. Energy value block 320 and correlation block 310 are each configured to receive information of symbols received at the packet detection unit, and to provide information for use by the packet detection block.

Correlation block 310 is configured to determine a measure of a correlation between the received information of the symbol and synchronization information. Generally packet preamble symbols will include synchronization information in the form of a predefined sequence. Thus, a preamble symbol comprising 128 useable samples for example may have those 128 samples each set to particular predefined values as a synchronization sequence. Thus, the correlation block is configured to detect receipt of a sequence of samples matching the particular predefined values.

In some embodiments, correlation block 310 is configured to determine the measure of the correlation in two stages, in view of a known structure of the synchronization information to be used by correlation block 310 to determine the measure of the correlation. For example, in some embodiments a synchronization sequence varies in a known manner, for example being formed of repeating groups of values, with the repeating groups of values effectively modulated by a cover sequence. In such instances, it may be beneficial to have a first stage determine a correlation with the group of values, and a second stage determine correlation with the cover sequence.

In some embodiments, correlation block 310 is also configured to receive a signal indicative of the number of symbols over which correlation block 310 determines the measure of the correlation. Additionally, in some embodiments, correlation block 310 is configured to receive one or more signals indicative of synchronization information by which the measure of the correlation will be determined. The indicative information may be, for example, an index representative of a particular synchronization sequence stored in a table of such sequences, or the particular synchronization sequence itself. In other embodiments, the synchronization information may be pre-stored at the packet detection unit of FIG. 2.

Energy value block 320 is configured to determine a measure of an energy value of the information of the symbol. In some embodiments, energy value block 320 is configured to determine a measure of the energy value over a predetermined number of samples of the information. In one embodiment, the number of samples corresponds to the number of samples in a symbol. In one embodiment, the energy value block determines a measure of the energy value for each symbol by determining the energy of each sample of the symbol and summing all energy values for a symbol. In one embodiment, each energy value is calculated as the magnitude-squared value of each sample, and the measure of the energy value is the sum of all or a predetermined number of the magnitude-squared values for a symbol.

Packet detection block 330 is configured to receive signals indicative of the measure of correlation determined by correlation block 310 and indicative of the energy value determined by energy value block 320. Packet detection block 330 determines whether a packet is detected based on the measure of correlation and energy value.

In some embodiments, packet detection block 330 is configured to determine if the packet has been detected by evaluating a relationship between the measure of correlation and the energy value. For example, in some embodiments, a greater measure of correlation is required for a greater energy value, and a lesser measure of correlation is required for a lesser energy value.

In some embodiments, packet detection block 330 is configured to determine that a packet has not been detected when the output of energy value block 320 indicates that the measure of the energy value is below a predetermined minimum energy threshold. The predetermined minimum energy threshold may be received at the packet detection unit, such as from an external source or a programmable register, or the predetermined minimum energy threshold may be pre-stored in the packet detection unit.

In some embodiments, the packet detection block 330 is also configured to receive one or more signals indicative of one or more predetermined energy thresholds by which packet detection will be determined, or preconfigured with such energy thresholds. For example in some embodiments three signals indicative of energy threshold are provided for, and different relationships between measure of correlation and energy value are used to determine if a packet has been detected between these thresholds.

Figure 3:
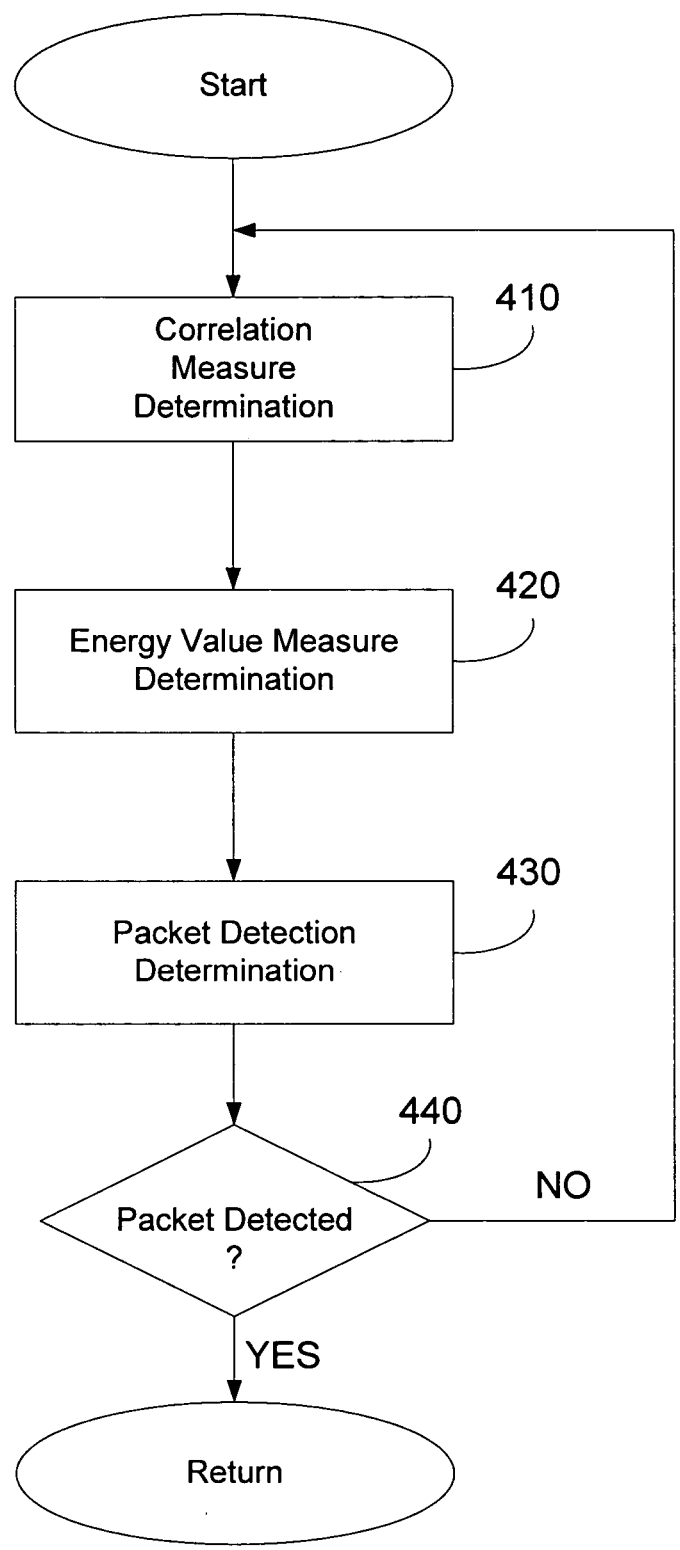
FIG. 3 illustrates a flowchart of an embodiment of a method of performing packet detection in accordance with aspects of the invention.

FIG. 3 illustrates a flowchart of an embodiment of a method of performing packet detection in accordance with aspects of the invention. The method of FIG. 3 includes a correlation measure determination 410, an energy value measure determination 420, a packet detection determination 430, and a packet detection inquiry 440. In some embodiments, correlation measure determination 410 is performed after energy value measure determination 420. Additionally, in some embodiments, determination 410 and determination 420 are performed substantially simultaneously.

In somewhat more detail, correlation measure determination 410 determines a measure of a correlation between the samples of the information of a received symbol and synchronization information. In most embodiments, the correlation measure determination performed is a cross correlation between the samples of the symbol and synchronization information, namely a synchronization sequence.

Energy value measure determination 420 determines a measure of an energy value of the information over a predetermined number of symbols. In one embodiment, the measure of the energy value is determined over a symbol period by determining the magnitude squared of each sample in the symbol period and summing all magnitude-squared values over the symbol period. Accordingly, the energy for each sample is determined and all energies for a symbol period are summed to determine the measure of the energy value.

The packet detection determination 430 determines whether a packet has been detected based on the measure of the correlation and the measure of the energy value. In some embodiments, the packet detection determination includes comparing the analyzed measure of the correlation and measure of the energy value to a selected energy threshold to determine if a packet has been detected.

In some embodiments, packet detection requires a higher correlation measure for higher energy value measures. Accordingly, as the measure of the correlation increases, an increase is also expected in the measure of the energy value, and vice versa. Therefore, increasing measures of correlations are required to indicate that a packet has been detected for increasing measures of energy values. When such is the case, in one embodiment, determination 430 determines that a packet is detected.

In some embodiments, packet detection determination 430 includes determining that a packet has not been detected when the measure of the energy value is below a predetermined minimum energy threshold. Packet detection determination 430 may be performed after receiving the predetermined minimum energy threshold.

In other embodiments, packet detection determination 430 includes threshold determination followed by comparator determination. During threshold determination, a signal indicative of a measure of an energy value is received. A threshold is determined based on the measure of an energy value.

In some embodiments, the threshold is selected from a plurality of predetermined thresholds according to the measure of an energy value. In some embodiments, the threshold and/or the plurality of thresholds are each received from external registers. In other embodiments, the threshold and/or the plurality of predetermined thresholds are pre-stored. In some embodiments, the threshold includes a fraction having numerator and denominator portions.

In other embodiments, the threshold determination may determine energy thresholds and slope thresholds that each define boundary regions for determining if a packet is detected or if a packet has not been detected. In some embodiments, the energy thresholds and the slope thresholds may be provided during threshold determination or may be pre-stored and accessed prior to threshold determination.

Comparator determination includes receiving a measure of a correlation, the measure of an energy value and the threshold determined during threshold determination. Comparator determination includes analyzing the measure of a correlation, the measure of an energy value and the threshold to determine if a packet has been detected.

In some embodiments, comparator determination includes determining if the packet has been detected by evaluating a relationship between the measure of the correlation and the measure of the energy value. For a determination that the packet has been detected, a ratio between the measure of the correlation and the measure of the energy value is required to be greater than the predetermined threshold. In one embodiment, the threshold is one. In other embodiments, the threshold is any number for which an increase in the measure of the correlation requires an increase in the measure of the energy value that is greater than the increase in the measure of the correlation.

At packet detection inquiry 440 if a packet is not detected, the process returns to correlation measure determination block 410. If a packet is detected, as is known to those skilled in the art, the process returns and any number of operations can be performed as indicative of a detected packet. In some embodiments, a signal may be output. In other embodiments, a state of a device may be changed.

Figure 4:
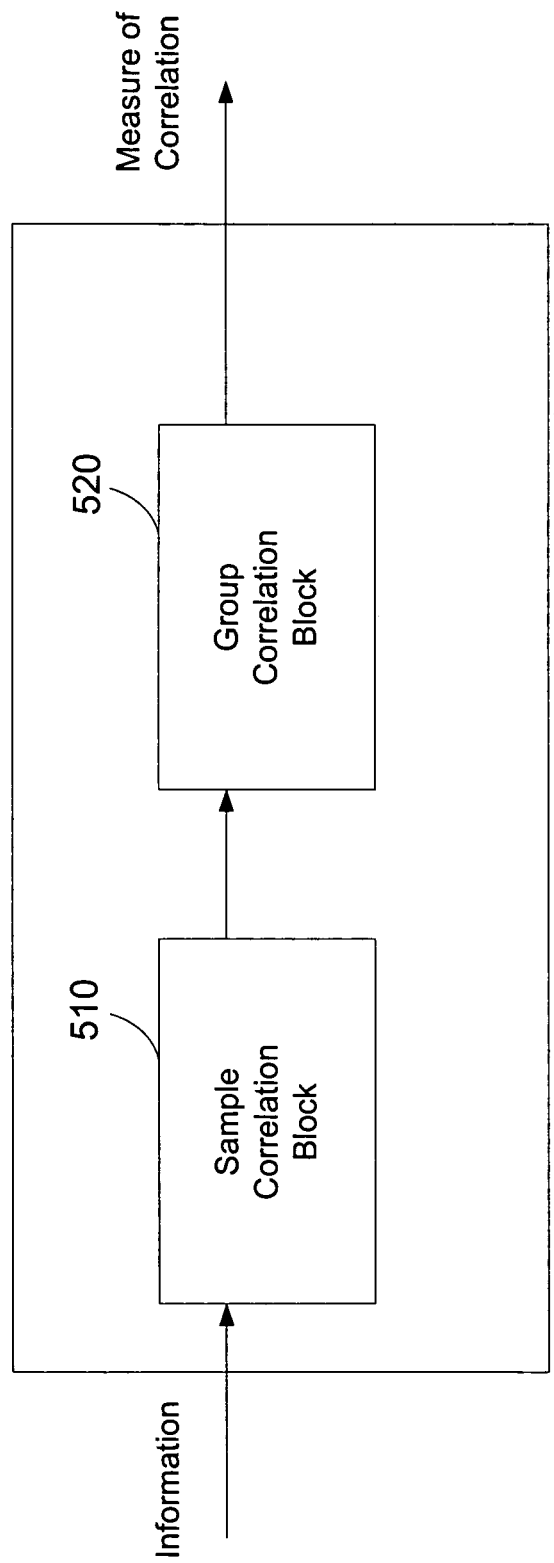
FIG. 4 is an illustration of an embodiment of a block diagram of a correlation block in accordance with aspects of the invention.

FIG. 4 is an illustration of an embodiment of a block diagram of a correlation block in accordance with aspects of the invention. The correlation block of FIG. 4 includes a sample correlation block 510 and a group correlation block 520. The correlation block determines a measure of a correlation between information of one or more symbols and a synchronization sequence indicated by a first synchronization sequence modified by a second synchronization sequence.

Sample correlation block 510 is configured to receive information of one or more symbols and determine a plurality of measures of sample correlations. Each measure of a sample correlation is a correlation between a predetermined number of samples of the information and the first synchronization sequence. In one embodiment, the predetermined number of samples of information is pre-stored in the correlation block of FIG. 4. In other embodiments, the correlation block of FIG. 4 is configured to receive a signal indicative of the predetermined number of samples. In some embodiments the pre-stored first synchronization sequence is selected from a plurality of pre-stored potential first synchronization sequences. The first synchronization sequence may be received at sample correlation block 510, for example, from an external register or it may be pre-stored in the correlation block of FIG. 4.

In some embodiments, the first synchronization sequence corresponds to a pattern by which portions of one or more symbols may be transmitted. In various embodiments, the pattern may be constant over time. In other embodiments, the pattern may be dynamic and change over time.

Group correlation block 520 is configured to receive a signal indicative of the output of sample correlation block 510 and the second synchronization sequence, and to determine a measure of a group correlation for a predetermined number of samples. Each measure of a group correlation is a measure of correlations between sample correlations and the second synchronization sequence. In some embodiments, the predetermined number of symbols is pre-stored in the correlation block of FIG. 4. In other embodiments, the correlation block of FIG. 4 is configured to receive a signal indicative of the predetermined number of symbols.

In some embodiments, the second synchronization sequence is pre-stored in the correlation block of FIG. 4. The pre-stored second synchronization sequence is selected from a plurality of pre-stored second synchronization sequences. In some embodiments, the second synchronization sequence is not pre-stored in the correlation block of FIG. 4. In these embodiments, the correlation block is configured to receive a signal indicative of the second synchronization sequence. Additionally, in some embodiments, the second synchronization sequence corresponds to an effective cover, which applied to a proto-synchronization sequence, results in the synchronization sequence. In various embodiments, the synchronization sequence or pattern may be constant over time. In other embodiments, the pattern is dynamic, and changes for example, depending on which of several time frequency hopping patterns are used for transmission of data.

Figure 5:
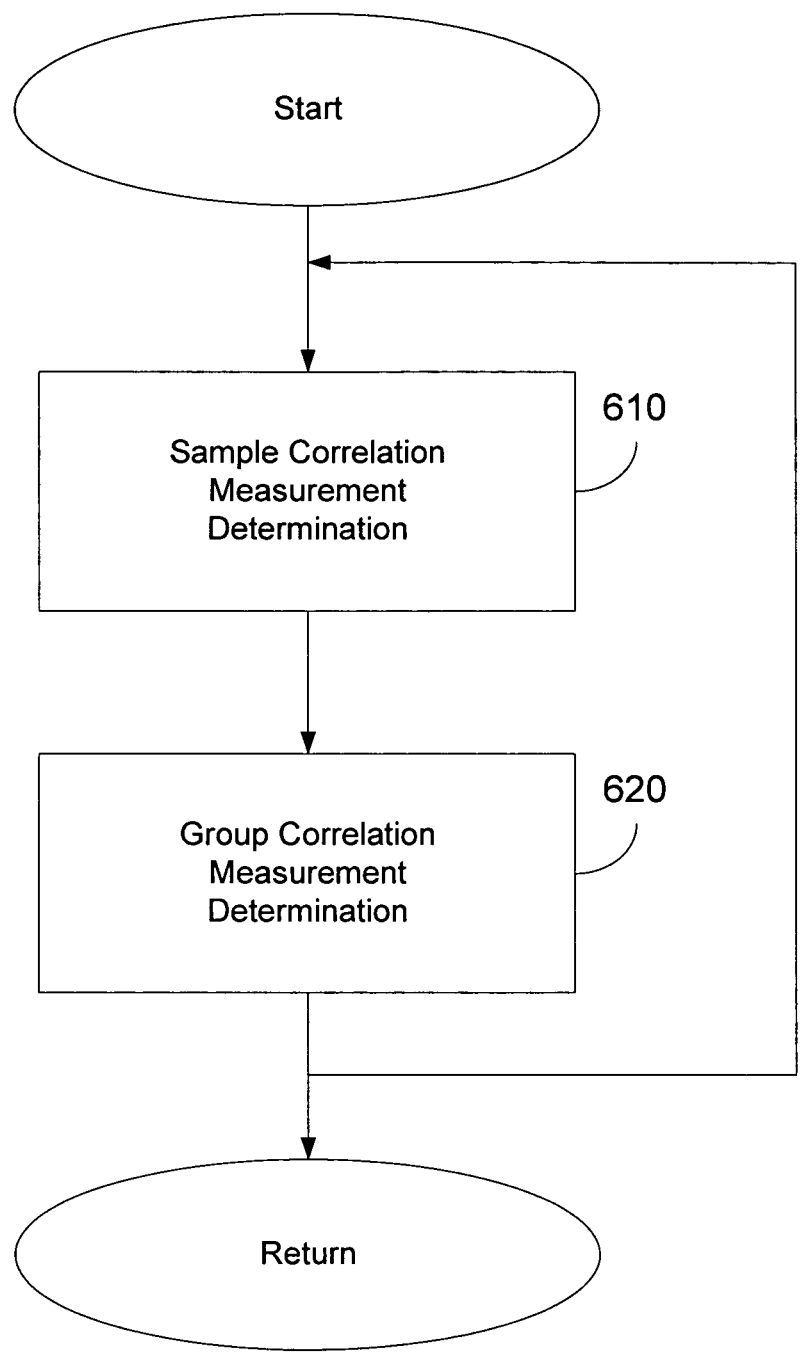
FIG. 5 illustrates a flowchart of an embodiment of a method of determining a measure of a correlation in accordance with aspects of the invention.

FIG. 5 illustrates a flowchart of an embodiment of a method of determining a measure of a correlation in accordance with aspects of the invention. The method of FIG. 5 includes sample correlation measure determination 610 followed by group correlation measure determination 620. The method determines the measure of the correlation between information of one or more symbols, a first synchronization sequence and a second synchronization sequence. The method makes the determination for a predetermined number of symbols.

In somewhat more detail, sample correlation measure determination 610 receives information of the one or more symbols and the first synchronization sequence and determines a plurality of measures of sample correlations. Each measure of a sample correlation is a correlation between a predetermined number of samples of information of the one or more symbols and the first synchronization sequence.

Sample correlation measure determination 610 determines measures of sample correlations for a predetermined number of symbols.

In some embodiments, sample correlation measure determination 610 includes determining measures of sample correlations wherein each measure of a sample correlation is a correlation between information of the one or more symbols, wherein the information of each symbol is received as groups of samples. Each of the samples in each group is correlated with a corresponding value within the first synchronization sequence. Each measure of a sample correlation is determined by summing the correlated values for each group of samples.

In some embodiments, sample correlation measure determination 610 is performed after accessing a pre-stored first synchronization sequence. The pre-stored first synchronization sequence may be selected from a plurality of pre-stored first synchronization sequences.

Additionally, in some embodiments, the first synchronization sequence corresponds to a pattern by which one or more symbols may be transmitted. In various embodiments, the pattern may be constant over time. In other embodiments, the pattern is dynamic and changes according to a change in a pattern by which the one or more symbols were transmitted.

In one embodiment, the number of samples in each group is predetermined. In some embodiments, the number of samples is equal to the number of values in the first synchronization sequence and is equal for all groups. In some embodiments, in which each symbol received is expected to have 128 samples of information, there are eight samples in each group, eight values in the first synchronization sequence and 16 groups. Accordingly, one of the eight samples in each group is correlated with one of the eight values in the first synchronization sequence. The correlated values for a group are summed and the result is a measure of a sample correlation. Sample correlation measure determination determines a plurality of measures of samples correlations by repeating the process for each group of samples of the one or more symbols.

Group correlation measure determination 620 receives measures of sample correlations and a second synchronization sequence and determines a measure of a group correlation. Each measure of a group correlation is a correlation between the measure of the sample correlations and the second synchronization sequence. Accordingly, in some embodiments, sample correlation measure determination 610 and group correlation measure determination 620 are each repeated for the predetermined number of symbols when the predetermined number of symbols is greater than one, before group correlation measure determination 620 determines the correlation.

In some embodiments, group correlation measure determination 620 includes receiving a number of measures of sample correlations and correlating each measure of a sample correlation with a corresponding value within the second synchronization sequence. A magnitude-squared value may be determined for each correlated value and all of the magnitude-squared values are summed to generate a measure of an intermediate group correlation.

A signal indicative of the measure of the intermediate group correlation and a signal indicative of a predetermined number of symbols for which intermediate group correlations should be accumulated is obtained. The intermediate group correlations are accumulated and summed to determine a measure of a correlation.

In some embodiments, the group correlation measure determination is performed after accessing a selected pre-stored second synchronization sequence. The pre-stored second synchronization sequence may be selected from a plurality of pre-stored second synchronization sequences. In other embodiments, the group correlation measure determination is performed after receiving a second synchronization sequence that is not pre-stored. Additionally, in some embodiments, the second synchronization sequence corresponds to a pattern by which one or more symbols may be transmitted. In various embodiments, the pattern may be constant over time. In other embodiments, the pattern is dynamic and changes according to a change in a pattern by which the one or more symbols were transmitted.

In some embodiments, when a measure of a sample correlation is correlated with a value in the second synchronization sequence that is substantially identical to the measure of the sample correlation, the correlated result is a positive one. In some embodiments, when a measure of a sample correlation is correlated with a value in the second synchronization sequence that is not substantially identical to the measure of the sample correlation, the correlated result is a negative one.

In some embodiments, the predetermined number indicating the number of the one or more symbols for which intermediate group correlations will be determined is pre-stored and is not received.

Figure 6:
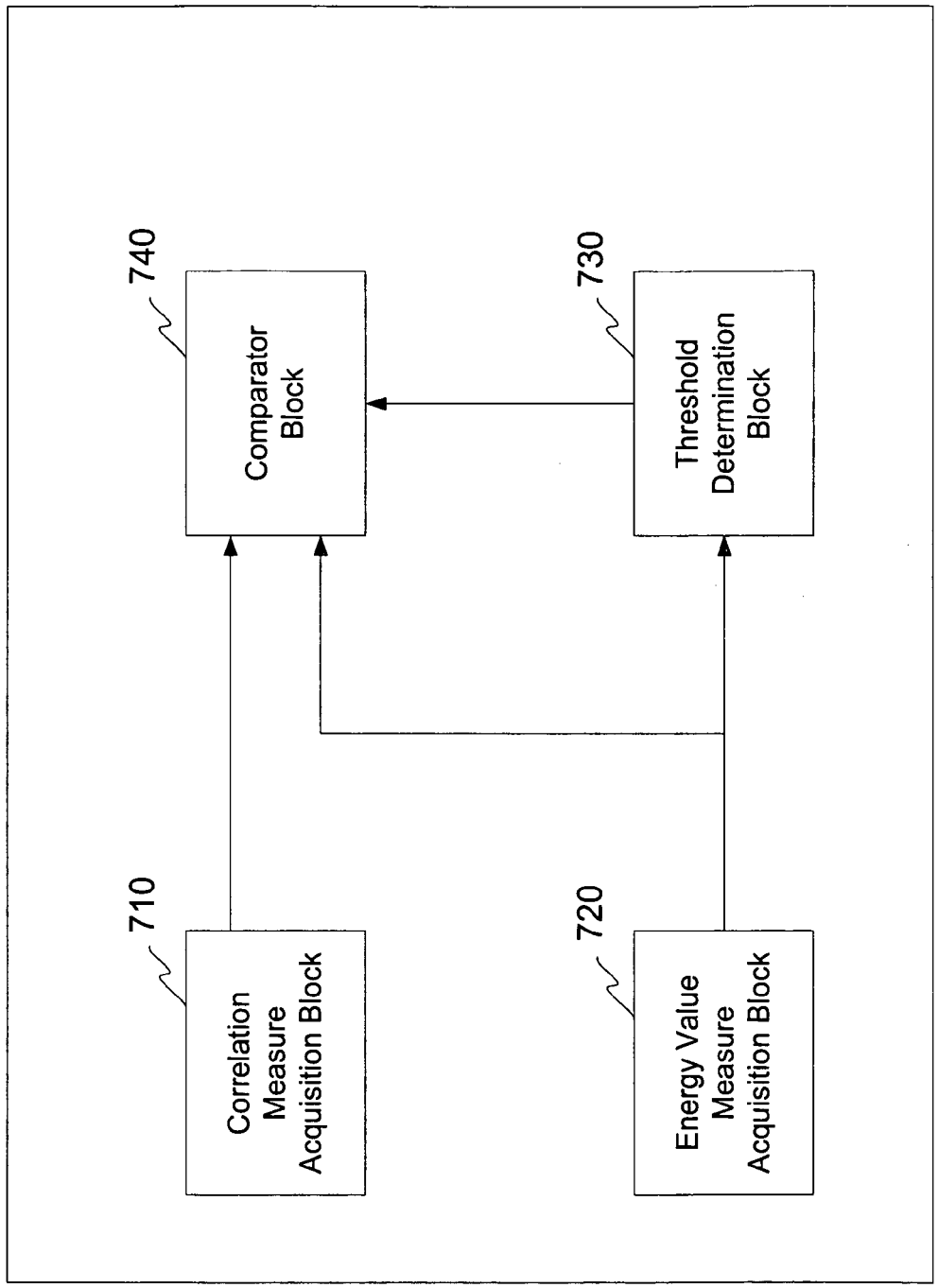
FIG. 6 illustrates a block diagram of a packet detection block in accordance with aspects of the invention.

FIG. 6 illustrates a block diagram of a packet detection block in accordance with aspects of the invention. The packet detection block of FIG. 6 includes a correlation measure acquisition block 710, an energy value measure acquisition block 720, a threshold determination block 730 and a comparator block 740. The packet detection block of FIG. 6 is configured to receive the output of correlation measure acquisition block 710, the output of energy value measure acquisition block 720 and the output of threshold determination block 730. The packet detection block of FIG. 6 is also configured to determine if a packet has been detected based on the received outputs.

Correlation measure acquisition block 710 is configured to receive a signal indicative of an output of a correlation block. In some embodiments, correlation measure acquisition block 710 is configured to receive a measure of a correlation.

Energy value measure acquisition block 720 is configured to receive a signal indicative of an output of an energy value block. In one embodiment, energy value measure acquisition block 720 is configured to receive a measure of an energy value.

Threshold determination block 730 is configured to receive a signal indicative of the output of energy value measure acquisition block 720 and determine an energy threshold based on the signal. In some embodiments, the energy threshold is selected from a plurality of predetermined energy thresholds according to the output of block 720. In some embodiments, threshold determination block 730 is configured to receive the energy threshold and/or the plurality of predetermined energy thresholds from external registers. In other embodiments, the energy threshold and/or the plurality of predetermined energy thresholds are pre-stored in the threshold determination block 730.

In some embodiments, the determined energy threshold includes a fraction having a numerator and denominator portions, which are each output from threshold determination block 730 to comparator block 740.

Comparator block 740 is configured to receive the output of correlation measure acquisition block 710, the output of energy value measure acquisition block 720 and the output of threshold determination block 730 and determine if a packet has been detected based on the received outputs.

In some embodiments, comparator block 740 is configured to determine if the packet has been detected by evaluating a relationship between the measure of the correlation and the measure of the energy value wherein for a determination that the packet has been detected, a ratio between the output of the correlation measure acquisition block 710 and the output of energy value measure acquisition block 720 is required to be greater than a predetermined threshold. In one embodiment, the threshold is one. In other embodiments, the threshold is any number for which an increase in the measure of the correlation requires an increase in the measure of the energy value that is greater than the increase in the measure of the correlation.

Figure 9:
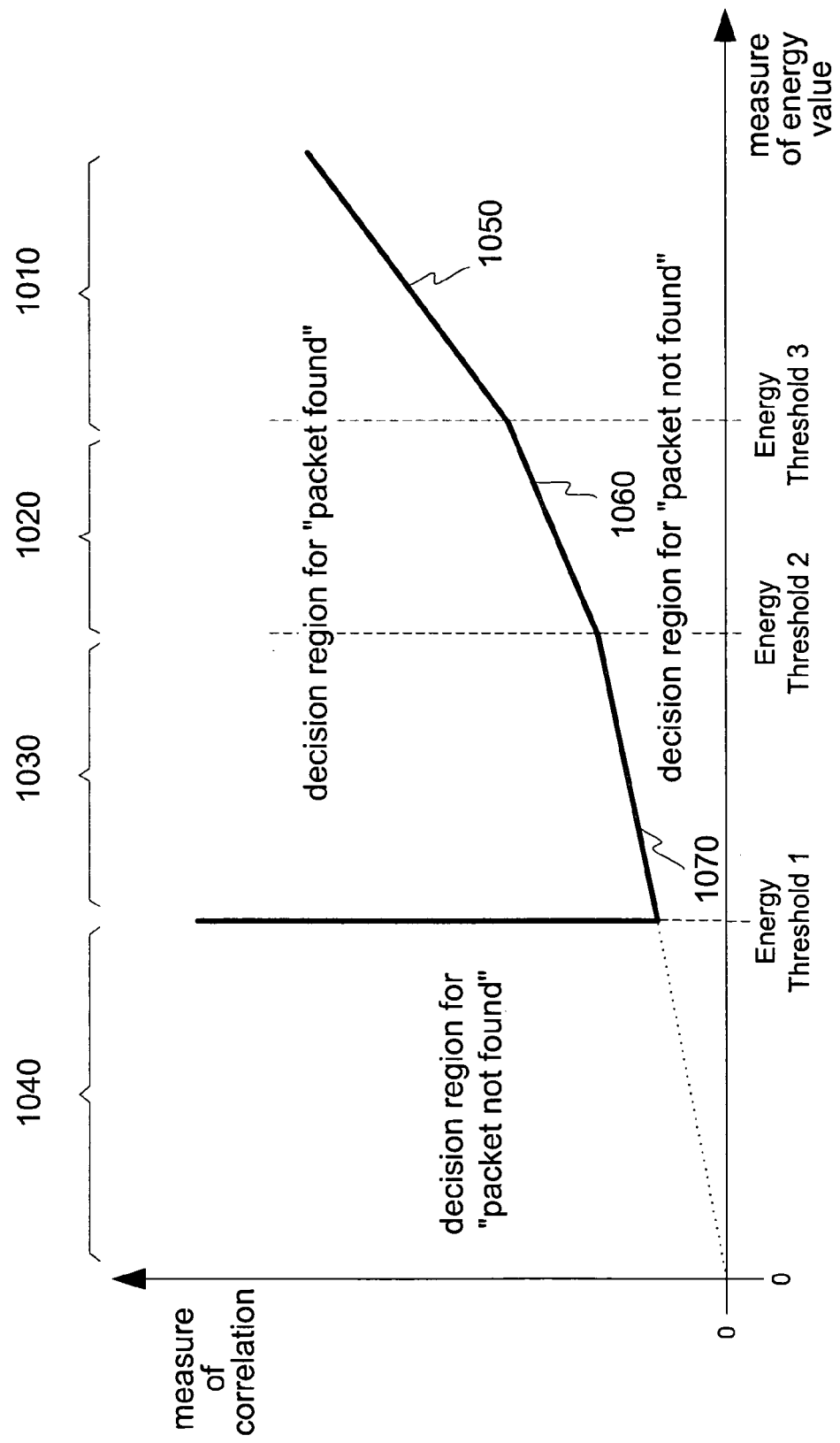
FIG. 9 is another illustration of an embodiment of decision regions for determining whether a packet has been detected or has not been detected.
Figure 10:
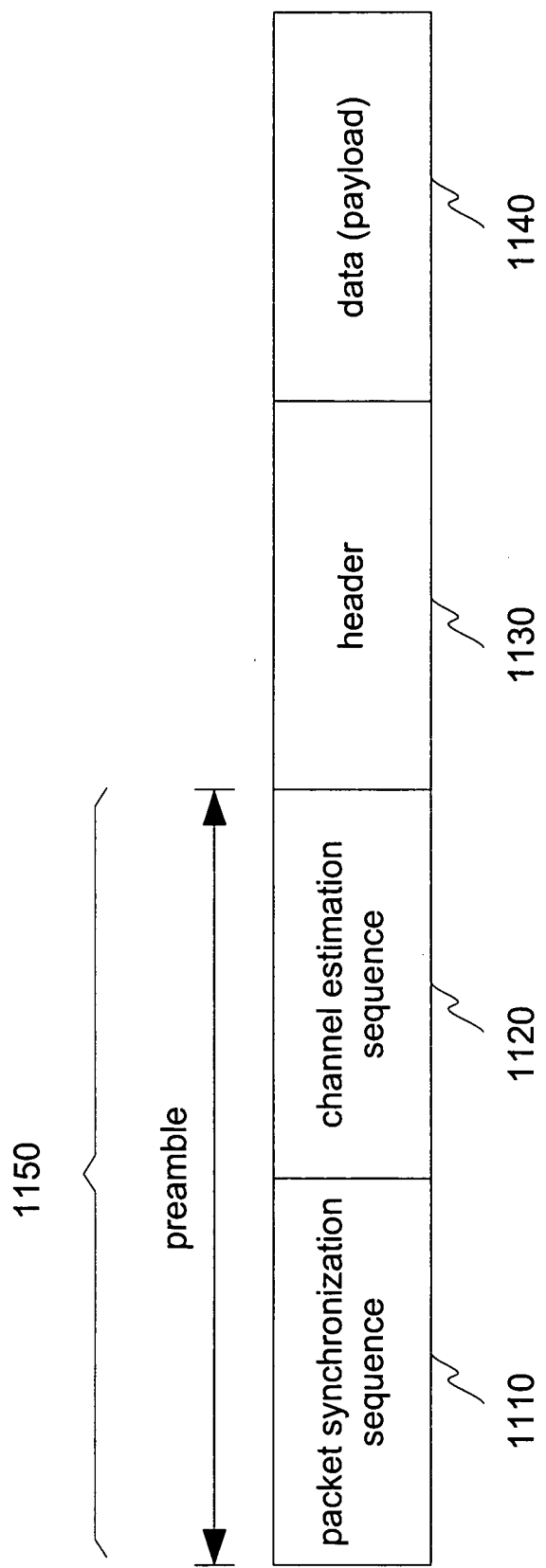
FIG. 10 is an illustration of an embodiment of a block diagram of a packet transmitted in a UWB communication system in accordance with aspects of the invention.

In other embodiments, comparator block 740 is configured to construct decision regions for determining whether a packet has been detected or has not been detected. Referring to FIGS. 9 and 10, the decision regions are each constructed from the signals indicative of a plurality of predetermined energy thresholds and the signals indicative of a plurality of predetermined line slopes.

The comparator block 740 is configured to map onto the measure of energy value and measure of correlation axes an output of a correlation acquisition block and an output of an energy value acquisition block, respectively. A determination is made as to whether the mapped values are within a decision region indicating that a packet is detected or within a decision region indicating that a packet is not detected.

Figure 8:
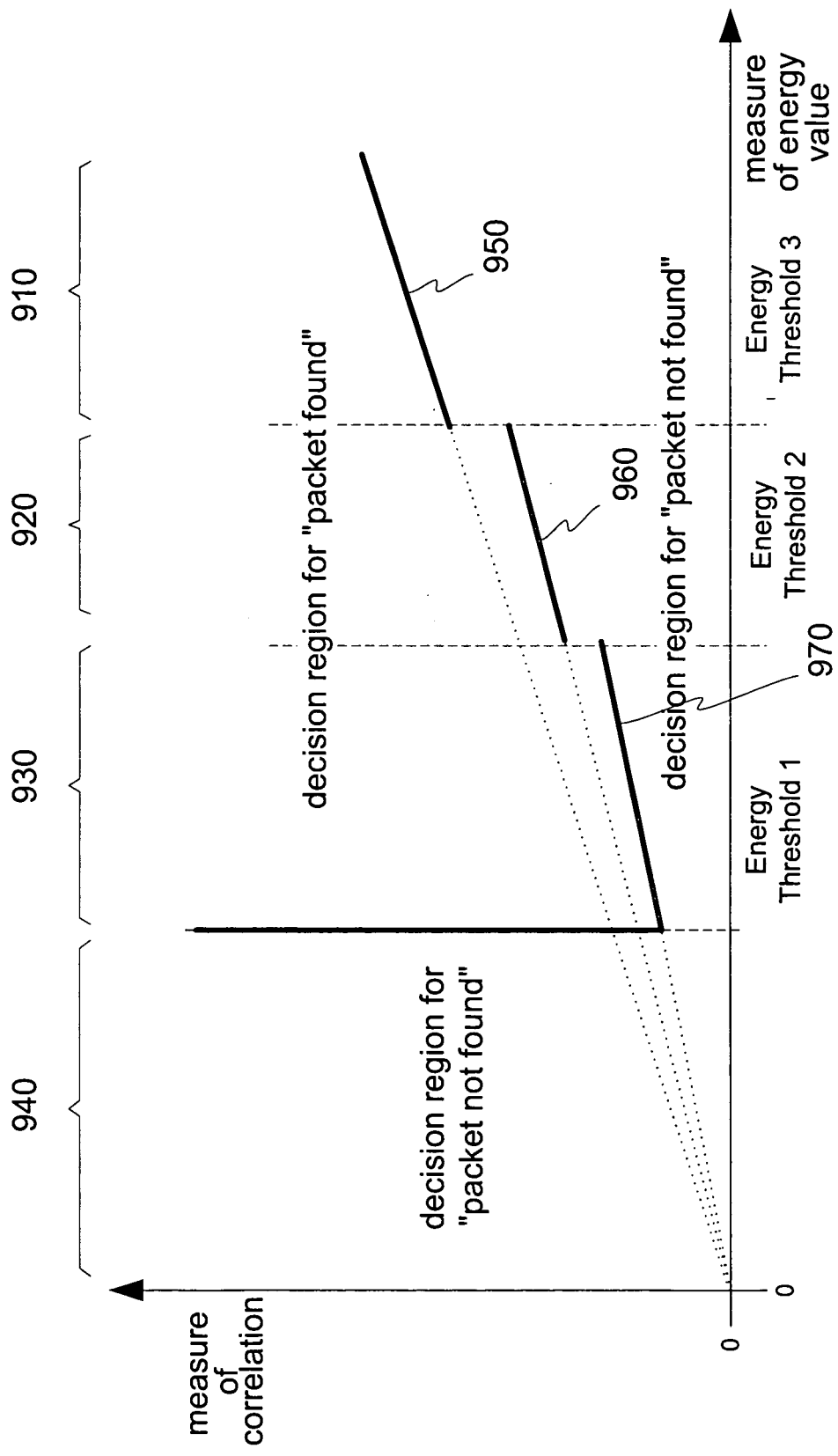
FIG. 8 is an illustration of an embodiment of decision regions for determining whether a packet has been detected or has not been detected.

Referring to FIG. 8, the sub-region 940 for energy values less than the lowest energy threshold, energy threshold 1, is a decision region indicating that a packet has not been found. Accordingly, comparator block 740 is configured to determine that a packet has not been detected for any symbols with a measure of energy value that is less than the minimum energy threshold, energy threshold 1.

In one embodiment, the output of the correlation acquisition block and the output of the energy value acquisition block are the measure of the correlation and the measure of the energy value, respectively.

Region 930 is bounded by energy thresholds 1 and 2 and includes a decision region indicating that a packet has not been detected for measures of correlations and measures of energy values that map into a decision region below the line dictated by line slope 970, and indicating that a packet has been detected for measures of correlations and measures of energy values that map into a decision region above the line dictated by line slope 970.

Region 920 is bounded by energy thresholds 2 and 3 and includes a decision region indicating that a packet has not been detected for measures of correlations and measures of energy values that map into a decision region below the line dictated by line slope 960, and indicating that a packet has been detected for measures of correlations and measures of energy values that map into a decision region above the line dictated by line slope 960.

Region 910 is bounded by energy threshold 3 and includes a decision region indicating that a packet has not been detected for measures of correlations and measures of energy values that map into a decision region below the line dictated by line slope 950, and indicating that a packet has been detected for measures of correlations and measures of energy values that map into a decision region above the line dictated by line slope 950. In some embodiments, line slope 950 includes a numerator and a denominator that results in line slope 950 having a downward slope.

In some embodiments, the decision region indicating that a packet has been detected exemplifies the case when the measure of the correlation (cc) normalized by the measure of the energy value (ec) is greater than the line slope of the corresponding energy sub-region. This case can be written as:

$$\frac{cc}{ec} > slope = \frac{numerator}{denominator}$$

OR $measureofenergyvalue \cdot \text{numerator} - measureofcorrelation \cdot \text{denominator} < 0,$ wherein the numerator and the denominator are each the values assigned for a predetermined energy threshold. A packet is determined to be detected if the above inequality is fulfilled.

FIG. 9 is another embodiment of a decision region that can be employed by comparator block 740 to determine whether a packet has been detected. The decision regions are formed using the plurality of energy thresholds defining sub-regions 1040, 1030, 1020, 1010 and the line slopes 1070, 1060, 1050, similar to that described with regard to FIG. 8. In some embodiments, line slope 1050 includes a numerator and a denominator that results in line slope 1050 having a downward slope. In this embodiment, the lines providing the lower boundary of the decision region indicating that a packet has been detected are connected. This can be achieved by accounting for the respective offsets on each of the axes by offsetting the measure of the correlation (cc) and the measure of the energy value (ec) by one of a plurality of correlation thresholds (CC_Thresh) and one of a plurality of predetermined energy thresholds (Energy_Thresh), respectively.

For example, to determine that a packet has been detected, in one embodiment, for sub-region 1020, the following inequality must be true:

$$\frac{cc - CC\_THRESH2}{ec - ENERGY\_THRESH2} > \frac{NUM2}{DENOM2} = \frac{numerator}{denominator}$$

with CC_THRESH2 computed as $$CC\_THRESH2 = \frac{NUM1}{DENOM1} \cdot ENERGY\_THRESH2$$

wherein NUM2/DENOM2 represents line slope 1060 and ENERGY_THRESH 2 represents energy threshold 2. Correspondingly, for the third segment, we have $$\frac{cc - CC\_THRESH3}{ec\_ENERGY\_THRESH3} > \frac{NUM3}{DENOM3} = \frac{numerator}{denominator}$$

with CC_THRESH3 computed as $$CC\_THRESH3 = \frac{NUM2}{DENOM2} \cdot (ENERGY\_THRESH3 - ENERGY\_THRESH2) + CC\_THRESH2$$

so on, wherein NUM2/DENOM2 represents line slope 1060 and ENERGY_THRESH 2 and ENERGY_THRESH 3 represent energy thresholds 2 and 3, respectively.

Figure 7:
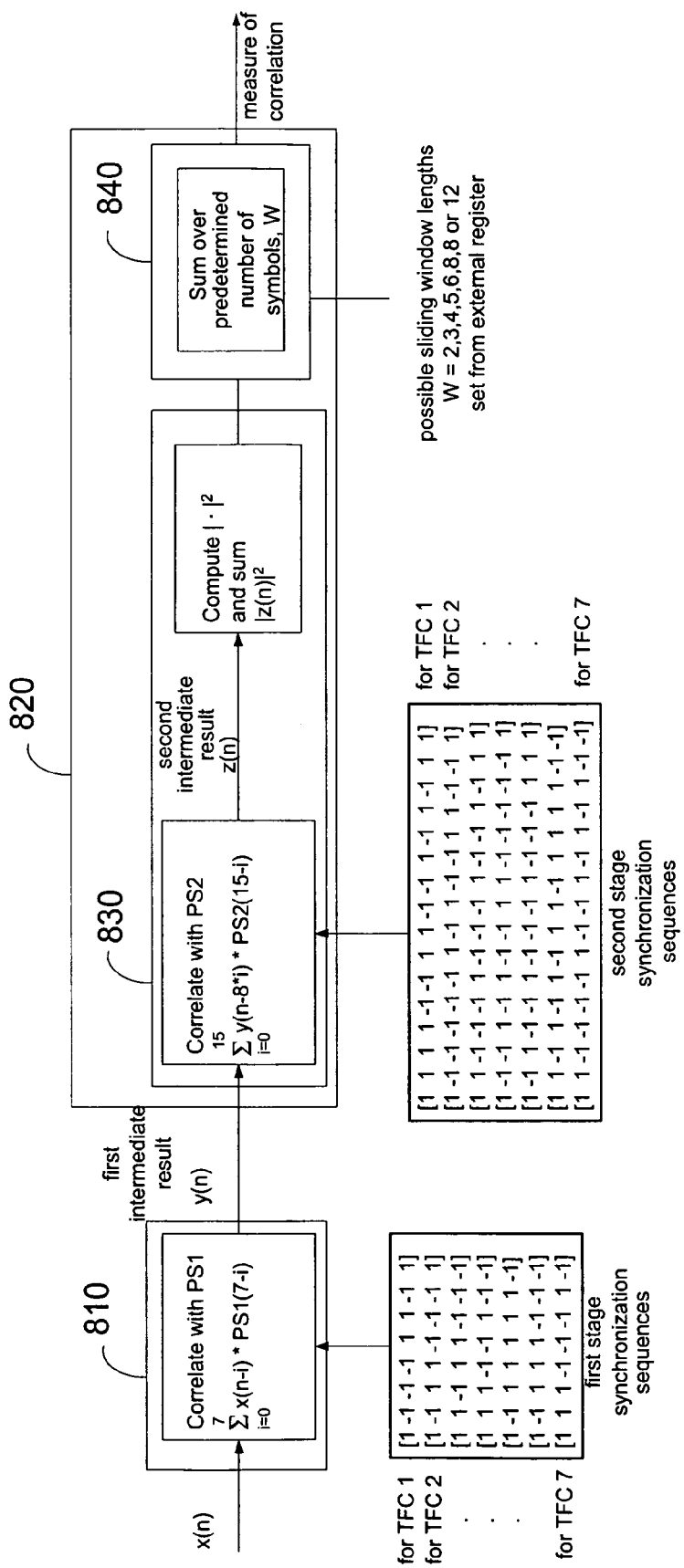
FIG. 7 is an illustration of an embodiment of a block diagram of a correlation block in accordance with aspects of the invention.

FIG. 7 is an illustration of an embodiment of a block diagram of a correlation block in accordance with aspects of the invention. The correlation block of FIG. 7 includes a first correlation block 810 and a second correlation block 820. The correlation block is also configured to determine a measure of a correlation between information of one or more symbols, a first synchronization sequence and a second synchronization sequence.

First correlation block 810 is configured to receive information of one or more symbols received at a unit for performing packet detection and to receive a first synchronization sequence. First correlation block 810 is configured to determine a plurality of measures of sample correlations. Each measure of a sample correlation is a correlation between a predetermined number of samples of the information and the first synchronization sequence. The first correlation block 810 is configured to receive the information of the one or more symbols as groups of samples. The first correlation block 810 is configured to correlate each of the samples in each group with a corresponding value within the first synchronization sequence. First correlation block 810 is configured to determine each measure of a sample correlation by summing the correlated values for each group of samples.

In one embodiment, the correlation block of FIG. 7 is configured to receive a signal indicative of the first synchronization sequence. The first synchronization sequence may be received at the correlation block of FIG. 7 from an external register. In other embodiments, the first synchronization sequence is pre-stored in the correlation block.

In one embodiment, the number of samples in each group is predetermined. In some embodiments, the number of samples is equal to the number of values in the first synchronization sequence and is equal for all groups.

In some embodiments in which each symbol received is expected to have 128 samples of information, there are eight samples in each group, eight values in the first synchronization sequence and 16 groups. Accordingly, one of the eight samples in each group is correlated with one of the eight values in the first synchronization sequence. The correlated values for a group are summed and the result is a measure of a sample correlation. First correlation block 810 is configured to determine a plurality of measures of samples correlations by repeating the process for each group in the one or more symbols.

In some embodiments, a predetermined number indicating the number of the one or more symbols for which measures of sample correlations will be determined is pre-stored in the correlation block of FIG. 7. In other embodiments, the correlation block of FIG. 7 is configured to receive a signal indicative of the number of the one or more symbols.

Additionally, in some embodiments, the first synchronization sequence corresponds to a pattern by which the one or more symbols were transmitted. In various embodiments, the pattern may be constant over time. In other embodiments, the pattern is dynamic and changes according to a change in a pattern by which the one or more symbols were transmitted.

In some embodiments, when the samples in each group are substantially identical to the values in the first synchronization sequence, the correlation block of FIG. 7 is configured to perform autocorrelations. In other embodiments, when the samples in each group are not substantially identical to the values in the first synchronization sequence, the first correlation block 810 is configured to perform cross-correlations.

In some embodiments, when a sample is correlated with a value in the first synchronization sequence that is substantially identical to the sample, the correlated result is a positive one. In some embodiments, when a sample is correlated with a value in the first synchronization sequence that is not substantially identical to the sample, the correlated result is a negative one.

Second correlation block 820 includes a sample correlation correlator 830 and an accumulator 840. Second correlation block 820 is configured to receive a signal indicative of the output of first correlation block 810 and a second synchronization sequence and determine a measure of a group correlation over one or more symbols. The second synchronization sequence may be received at the correlation block of FIG. 7 from an external register or may be pre-stored in the correlation block.

In some embodiments, the second synchronization sequence corresponds to a pattern by which the one or more symbols were transmitted. In various embodiments, the pattern may be constant over time. In other embodiments, the pattern is dynamic and changes according to a change in a pattern by which the one or more symbols were transmitted.

The sample correlation correlator 830 is configured to receive a number of measure of sample correlations and correlate each measure of a sample correlation with a corresponding value within the second synchronization sequence. Each plurality of measures of sample correlation is indicative of measures for one symbol. Sample correlation correlator 830 is also configured to determine a magnitude-squared value of each correlated value and sum all of the magnitude-squared values to generate a measure of an intermediate group correlation.

In some embodiments, when a sample correlation is correlated with a value in the second synchronization sequence that is substantially identical to the sample correlation, the correlated result is a positive one. In some embodiments, when a sample correlation is correlated with a value in the second synchronization sequence that is substantially antipodal to the sample correlation, the correlated result is a negative one.

Accumulator 840 is configured to receive a signal indicative of the measure of the intermediate group correlation and a signal indicative of a predetermined number of symbols for which intermediate group correlations should be accumulated. 840 is configured to accumulate the predetermined number of measures of intermediate group correlations and sum the measures of the intermediate group correlations to determine a measure of a correlation.

In some embodiments, the predetermined number indicating the number of the one or more symbols for which intermediate group correlations will be determined is pre-stored in the correlation block of FIG. 7.

In some embodiments of the correlation block of FIG. 7, the correlation block is configured to determine the measure of the correlation in two stages based on the known structure of synchronization information. The correlation block may perform such because the received symbols are transmitted having sample values that are matched to the synchronization information. A MAC processing unit such as that described in FIG. 1 determines the manner in which the samples of symbols are transmitted and accordingly, the proper synchronization information.

In a first stage, for a symbol having samples grouped into groups, each group of sample values is disposed to match (or have antipodal values of) a known first stage synchronization sequence of the synchronization information. Accordingly, when the samples values are correlated with the known first stage synchronization sequence, the measure of the sample correlation is one (or negative one when the sample values are the antipodal of the first stage synchronization sequence values).

In a second stage, for a plurality of sample correlations, since each first stage synchronization sequence was known and each group of samples was transmitted with known values, each of the plurality of sample correlations will match each value of a second stage synchronization sequence if there has been no distortion of the signal during transmission.

The second stage synchronization sequence is composed of a set of values indicative of whether the symbols were transmitted with sample values that were identical to (for which the second stage synchronization sequence value would be a one) or the antipodal value of (for which the second stage synchronization sequence value would be a negative one) the first stage synchronization sequence.

In one embodiment, in a first stage, eight complex samples of a symbol are correlated with a corresponding first stage synchronization sequence of eight values. The first stage synchronization sequence is one out of seven possible sequences depending on the manner in which the signal was transmitted. The correlated value is determined as a first intermediate result. In one embodiment, the values are correlated by multiplying the sample values with the first stage synchronization sequence values and summing the results.

In a second stage, 16 first intermediate results are correlated with a second stage synchronization sequence, which is one out of seven possible sequences depending on the manner in which the signal was transmitted. The correlated result is a second intermediate result. The magnitude-squared of the second intermediate result is determined and the process is repeated for any number of symbols. The magnitude-squared of the one or more second intermediate results are determined and summed. The result is a measure of a correlation.

In one embodiment, for TFC 1={1 −1 −1 −1 1 1−1 1}, transmitted sample values of a symbol are: {1 −1 −1 −1 1 1 1 −1 1 1 −1 −1 −1 1 1 −1 1 1 −1 −1 −1 1 1 −1 1 1 −1 −1 −1 1 1 −1 1 −1 1 1 1 −1 −1 1 −1 −1 1 1 1 −1 −1 1 1−1 1 −1 1 −1 1 1 1 −1 1 1 −1 −1 −1 1 1 1 −1 1 −1 1 1 1 1 −1 −1 1 1 −1 1 −1 −1 −1 1 1 1 −1 1 −1 1 1 1 −1 −1 1 1 −1 1 −1 1 1 1 1 −1 1 −1 −1 −1 1 1 −1 1 −1 1 1 1 −1 −1 1 1 −1 1 1}. When these values are correlated with TFC 1, in an ideal case with no signal distortion, the sample correlations are {1 1 1 1 −1 −1 1 1 −1 −1 1 −1 1 −1 1 1}, which is a sequence that is identical to a second stage synchronization sequence for TFC 1. Accordingly, correlating the sample correlations with the second stage synchronization sequence results in a high measure of correlation.

FIG. 10 is an illustration of an embodiment of a block diagram of a packet transmitted in a UWB communication system in accordance with aspects of the invention. The packet of FIG. 11 includes a packet synchronization sequence 1110, a channel estimation sequence 1120, a header 1130 and a data (payload) section 1140, each of which contain one or more OFDM symbols. Packet synchronization sequence 1110 and channel estimation sequence 1120 make up a preamble 1150 of the packet.

The packet synchronization sequence 1110 includes symbols having a predetermined sequence for determining if a packet has been detected. In some embodiments, packet synchronization sequence 1110 is also used for frame synchronization and automatic gain control. With reference to FIGS. 1 and 2, each of the symbols in packet synchronization sequence 1110 is received at receiver antenna 110 and receiver antenna 210, respectively. With reference to FIGS. 1 and 42, samples of each symbol are received at a signal processing block 130, 230, respectively, for determining if a packet has been detected.

In one embodiment in which the packet contains a short preamble, packet synchronization sequence 1110 includes 12 OFDM symbols. In other embodiments in which the packet contains a long preamble, packet synchronization sequence 1110 includes 24 OFDM symbols. In some embodiments, channel estimation sequence 1120 contains six OFDM symbols, header 1130 includes 12 OFDM symbols and data (payload) section 1140 contains a number of OFDM symbols that depends on the number of bytes in data (payload) section 1140.

Figure 11:
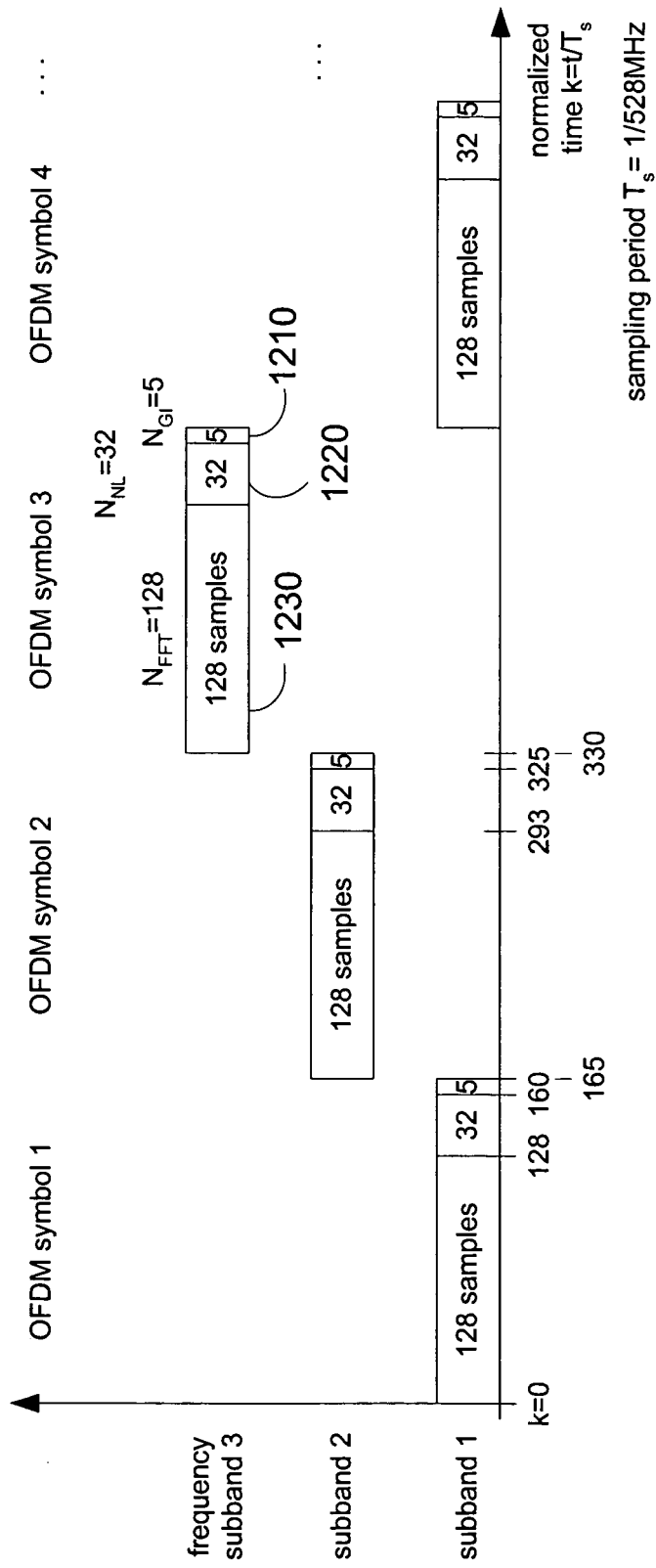
FIG. 11 is an illustration of a diagram of an embodiment of time-frequency interleaved transmission of OFDM symbols in accordance with aspects of the invention.

FIG. 11 is an illustration of a diagram of an embodiment of OFDM symbols in accordance with aspects of the invention. Each OFDM symbol includes samples that make up a guard interval 1210, a null prefix 1220 and data samples 1230. Data samples 1230 make up the portion of the symbol that is later transformed in an FFT processing unit such as that shown in FIG. 1.

Prior to transmission, the null prefix samples and the guard interval samples are set to zero. The null prefix samples are used for increased effective transmitter power, and the guard time interval samples are used to buffer any transient effects due to the change in frequency that occurs with frequency hopping. In one embodiment, time-frequency interleaved frequency hopping occurs. The guard time interval samples are positioned in time to correspond to the time interval over which the frequency hop is designed to occur. Accordingly, the guard interval samples are assumed to be invalid and therefore not further used during the baseband processing.

In the embodiment shown in FIG. 11, guard interval 1210 contains 5 samples, null prefix 1220 contains 32 samples and data samples 1230 contain 128 samples. Each of the time samples is sampled at frequency 528 MHz, corresponding to a sampling period of 1/528 MHz. In other embodiments, the sampling frequency and corresponding sampling period may be set to other values. The 165 samples are received at a receiver in the order of: data samples, null prefix samples and then guard interval samples. Accordingly, the null prefix samples are actually a postfix as they are located after the data samples; however, the null prefix samples shall be referred to as "null prefix samples" herein. Further, in other embodiments, a cyclic prefix may be used instead of a null prefix.

FIG. 12 is a time frequency code (TFC) table in accordance with aspects of the invention. OFDM symbols are transmitted on a plurality of subbands that represent portions of channels in a UWB communication system. The pattern by which OFDM symbols are transmitted is dictated by the TFC. TFC is ascertained by a MAC processing unit such as that shown in FIG. 1. Samples of OFDM symbols are indicative of the TFC by which the symbols are transmitted.

In some embodiments, seven TFCs exist for three subbands of a channel in a UWB communication system. Time unit k corresponds to the time at which time samples included in an OFDM symbol are transmitted on a particular subband. The logical channels make use of the frequency subbands, with any one logical channel using at most a single frequency subband at a time. Embodiments of the invention are not limited to the TFCs provided in FIG. 12 as other embodiments of TFCs are also possible and envisaged. For example, the TFC may incorporate fewer or greater number of subbands from that illustrated in FIG. 12 and the TFC may involve different time-frequency interleaved patterns across the set of subbands. As illustrated in FIG. 12, for example, for TFC=1 or 2, every third OFDM symbol is transmitted on the same subband.

Accordingly, methods and systems for packet detection are provided. Although described with respect to certain embodiments, it should be recognized the invention includes the claims and their insubstantial variations supported by the disclosure.

What is claimed is:

1. A method executed by circuitry of a signal processor in a communication system of performing packet detection in a receiver, the method comprising:
   determining a measure of a correlation between information of one or more received symbols and synchronization information;
   determining a measure of an energy value of one or more of the received symbols; and
   determining if a packet has been detected based on comparative analysis of both the measure of the correlation and the measure of the energy value, wherein the synchronization information comprises:
   a first synchronization sequence; and
   a second synchronization sequence, each of the first synchronization sequence and the second synchronization sequence indicative of a pattern by which the one or more received symbols are transmitted.

2. The method of claim 1, wherein the measure of the energy value is a value within an energy sub-region among a plurality of energy sub-regions.

3. The method of claim 1, wherein determining if the packet has been detected is performed by evaluating a relationship between the measure of the correlation and the measure of the energy value wherein for a determination that the packet has been detected, a higher measure of the correlation requires a higher measure of the energy value.

4. The method of claim 1, wherein determining if the packet has been detected is performed by evaluating a relationship between the measure of the correlation and the measure of the energy value wherein for a determination that the packet has been detected, an increase in the measure of the correlation requires an increase in the measure of the energy value that is greater than the increase in the measure of the correlation.

5. The method of claim 1, wherein determining if the packet has been detected is performed by evaluating a relationship between the measure of the correlation and the measure of the energy value wherein for a determination that the packet has not been received, the measure of the energy value is below a predetermined minimum energy threshold.

6. A method executed by circuitry of a signal processor in a communication system of performing packet detection in a receiver, the method comprising:
   determining a measure of a correlation between information of one or more received symbols and synchronization information;
   determining a measure of an energy value of one or more of the received symbols; and
   determining if a packet has been detected based on comparative analysis of both the measure of the correlation and the measure of the energy value, wherein determining the measure of the correlation comprises:
   determining a plurality of measures of sample correlations by correlating samples of the one or more received symbols with a first synchronization sequence of the synchronization information; and
   determining a measure of a group correlation by correlating the plurality of measures of the sample correlations with a second synchronization sequence of the synchronization information.

7. A method executed by circuitry of a signal processor in a communication system of performing packet detection in a receiver, the method comprising:
   determining a measure of a correlation between information of one or more received symbols and synchronization information;
   determining a measure of an energy value of one or more of the received symbols; and
   determining if a packet has been detected based on comparative analysis of both the measure of the correlation and the measure of the energy value, wherein determining if the packet has been detected is performed by evaluating a relationship between the measure of the correlation and the measure of the energy value wherein for a determination that the packet has been detected, a ratio between the measure of the correlation and the measure of the energy value is required to be greater than a selected energy threshold.

8. The method of claim 7, wherein the selected energy threshold is selected from among a plurality of predetermined energy thresholds, the selected energy threshold being indicative of the measure of the energy value.

9. A packet detection unit in a receiver, the packet detection unit comprising:
   a correlation block configured to receive one or more symbols and determine a measure of a correlation between information of the one or more symbols and synchronization information;
   an energy value block configured to receive the one or more symbols and determine a measure of the energy value of the one or more symbols; and
   a packet detection block coupled to the correlation block and to the energy value block, the packet detection block configured to receive the measure of the correlation and the measure of the energy value and determine if a packet has been detected based on a comparative analysis of both the measure of the correlation and the measure of the energy value,
   wherein the packet detection block determines if the packet has been detected by evaluating a relationship between the measure of the correlation and the measure of the energy value wherein for a determination that the packet has been detected, a ratio between the measure of the correlation and the measure of the energy value is required to be greater than a predetermined threshold.

10. The packet detection unit of claim 9, wherein the correlation block comprises:
    a sample correlation block configured to determine a plurality of measures of sample correlations between samples of the one or more symbols and a first sequence of the synchronization information; and
    a group correlation block configured to determine a measure of a group correlations by correlating the plurality of measures of the sample correlations and a second sequence of the synchronization information.

11. The packet detection unit of claim 9, wherein the measure of the energy value is a value within an energy sub-region among a plurality of energy sub-regions.

12. The packet detection unit of claim 9, wherein the packet detection block determines if the packet has been detected by evaluating a relationship between the measure of the correlation and the measure of the energy value wherein for a determination that the packet has been detected, a higher measure of the correlation requires a higher measure of the energy value.

13. The packet detection unit of claim 9, wherein the predetermined threshold is a selected threshold among a plurality of thresholds, wherein the selected threshold is indicative of the measure of the energy value.

14. The packet detection unit of claim 9, wherein the packet detection block determines if the packet has been detected by evaluating a relationship between the measure of the correlation and the measure of the energy value wherein for a determination that the packet has been detected, an increase in the measure of the correlation requires an increase in the measure of the energy value that is greater than the increase in the measure of the correlation.

15. The packet detection unit of claim 9, the packet detection block determines if the packet has been detected by evaluating a relationship between the measure of the correlation and the measure of the energy value wherein for a determination that the packet has not been received, the measure of the energy value is below a predetermined minimum energy threshold.

* * * * *